United States Patent [19]

Baumgartner et al.

[11] Patent Number: 5,447,377
[45] Date of Patent: Sep. 5, 1995

[54] SEALED-BEARING ROLLER ASSEMBLY

[76] Inventors: Kevin A. Baumgartner, 2404 ½ Bemidji Ave. N., Bemidji, Minn. 56601; Duane W. Baumgartner, R.R. 2, Box 47, Roseau, Minn. 56751

[21] Appl. No.: 227,403

[22] Filed: Apr. 14, 1994

[51] Int. Cl.⁶ ............................................. F16C 19/06
[52] U.S. Cl. ................................... 384/477; 384/488; 384/537; 384/903
[58] Field of Search ............... 384/477, 488, 484, 449, 384/537, 903

[56] References Cited

U.S. PATENT DOCUMENTS

| | | |
|---|---|---|
| 3,469,892 | 9/1969 | Langstroth . |
| 3,625,575 | 12/1971 | Darnell . |
| 4,006,945 | 2/1977 | Sekerich . |
| 4,235,489 | 11/1980 | Schickling et al. ................. 384/903 |

*Primary Examiner*—Lenard A. Footland
*Attorney, Agent, or Firm*—David A. Lingbeck

[57] ABSTRACT

This invention relates to a sealed-bearing roller assembly comprising a double sealed bearing means, an axle member compressibly engaged in the bearing means, and a roller body preferably made of Polyethylene plastic and securely mounted about the bearing means. The roller body has a protective side wall to substantially prevent unwanted moisture and debris from penetrating inside the roller body and damaging and wearing out the bearing means which has two seals to substantially prevent foreign matter from penetrating inside the bearing means. The sealed-bearing roller assembly is longer lasting, more quiet, more resistant to rust and corrosion, and comparably resistant to abrasive materials than the prior art which is commonly made of steel.

6 Claims, 4 Drawing Sheets

SEALED-BEARING ROLLER ASSEMBLY

BACKGROUND OF THE INVENTION

This invention relates to a sealed-bearing roller assembly which can be used on garage doors, cabinet drawers, etc., and which can be adapted to be used on conveyor systems as such.

Roller assemblies are known in the art and are used to open vertical moveable garage doors, cabinet drawers, and to operate conveyor systems as such. However, the prior art is flawed with problems such as exposing the bearings to the outside elements such as moisture, dirt, etc. which damage the bearings. Also, the prior art is quite noisy in operation since the roller bodies are made of metal alloys which effect noise as the roller bodies are moved upon a like surface or track.

One know prior art is a ROLLER ASSEMBLY, U.S. Pat. No. 4,306,756, which comprises a shaft having a shoulder at one end thereof, an inner ring and an outer ring with a plurality of balls arranged between said inner and outer ring, a cupshaped member embracing the outer ring, and a single seal member positioned between said inner and outer rings.

Another known prior art is a ROLLER, U.S. Pat. No. D266,396.

Another known prior art is a ROLLER BEARING ASSEMBLY, U.S. Pat. 4,006,945, which comprises a base plate, a tubular outer race member formed of polymeric resin and a coaxial tubular inner member formed of metal with a plurality of balls deposited between the outer and inner race members.

Another known prior art is a SPHERICAL ROLLER BEARING, U.S. Pat. No. 5,119,446, which comprises an inner ring, spherical outer ring, roller bodies between the rings, and seals.

Another known prior art is a ANTI-FRICTION ROLLER, U.S. Pat. No. 3,625,575.

Another known prior art is a SHIELDED-BEARING ROLLER FOR SUSPENSION DEVICES, U.S. Pa. No. 3,469,892.

Upon review of the prior art, none describes the sealed-bearing roller assembly of the present invention which is more durable and longer lasting and more resistant to wear than the prior art and which is also more quiet in operation than the prior art because the roller body is formed of Polyethylene plastic. There is a definite need for a sealed-bearing roller assembly which overcomes the problems of the prior art.

SUMMARY OF THE INVENTION

The present invention relates to a sealed-bearing roller assembly comprising a double sealed bearing means having an inner race and an outer race spaced apart and defining an annular passage therebetween with eight balls moveably engaged in the passage. Two rubber ring seals are engaged between the inner and outer races to protect the lubricant and the balls in the passage from the elements of the environment such as water which is known to rust out the bearings. Aa axle member having a collar at one end thereof is securely engaged to the interior of the wall of the inner race. A roller body preferably formed of U.H.M.W. polyethylene is mounted about the bearing means for rotation with the outer race of the bearing means.

One objective of the present invention is provide a sealed-bearing roller assembly which is more durable and longer lasting than the prior art.

Another objective of the present invention is to provide a sealed-bearing roller assembly which has a roller member made of plastic which is less noisy during operation thereof than the conventional roller assemblies which are made of steel.

Also, another objective of the present invention is to provide a sealed-bearing roller assembly which has a roller member which is resistant to rust and corrosion and which produces less friction on the surfaces than the conventional roller assemblies including glass.

Further, another objective of the present invention is to provide a sealed-bearing roller assembly which comprises two ring seals to seal the bearing means so that moisture cannot get into the bearing means causing rust as in the prior art.

Yet, another objective of the present invention is to 9.5 provide a sealed-bearing roller assembly which allows the user to conveniently remove and replace the roller member from about the bearing means.

Further objects and advantages of the present invention will become more apparent as the description proceeds and when taken in conjunction with the accompanying drawings wherein:

DETAILED DESCRIPTION OF THE INVENTION

Figure 1:
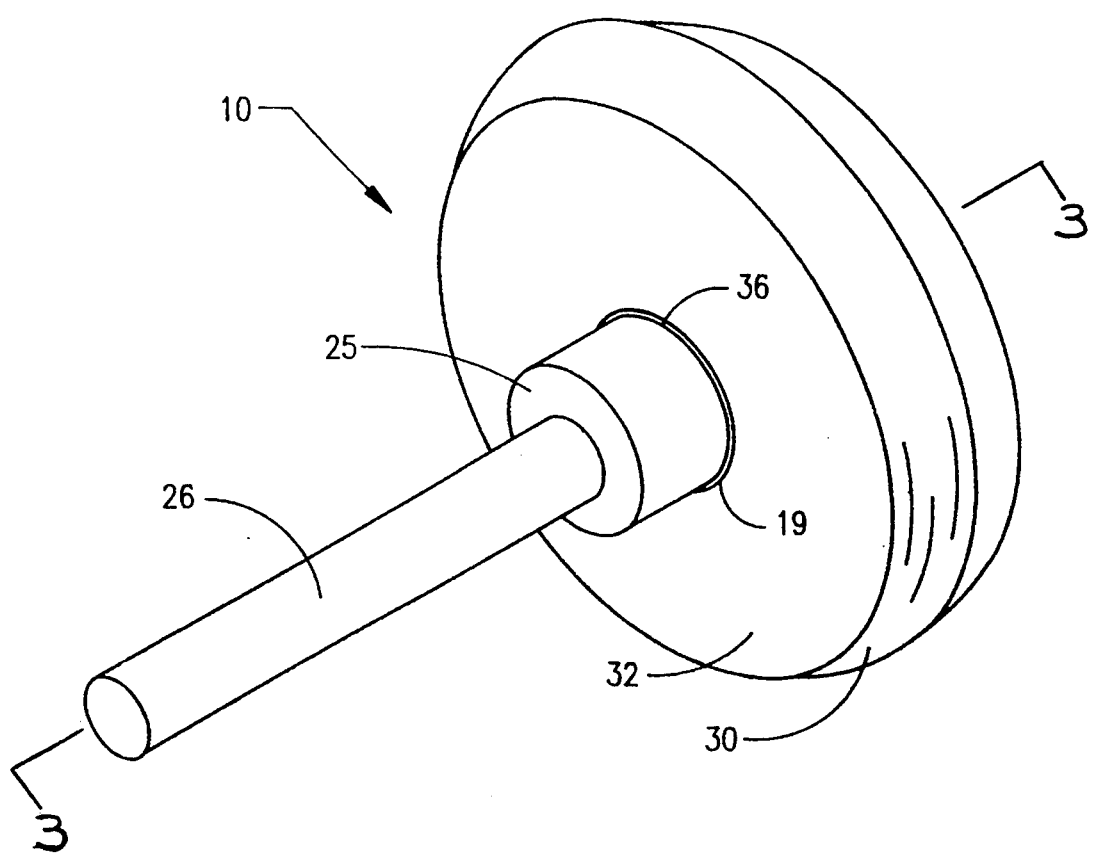
FIG. 1 is a perspective view from the shaft side of the sealed-bearing roller assembly.
Figure 2:
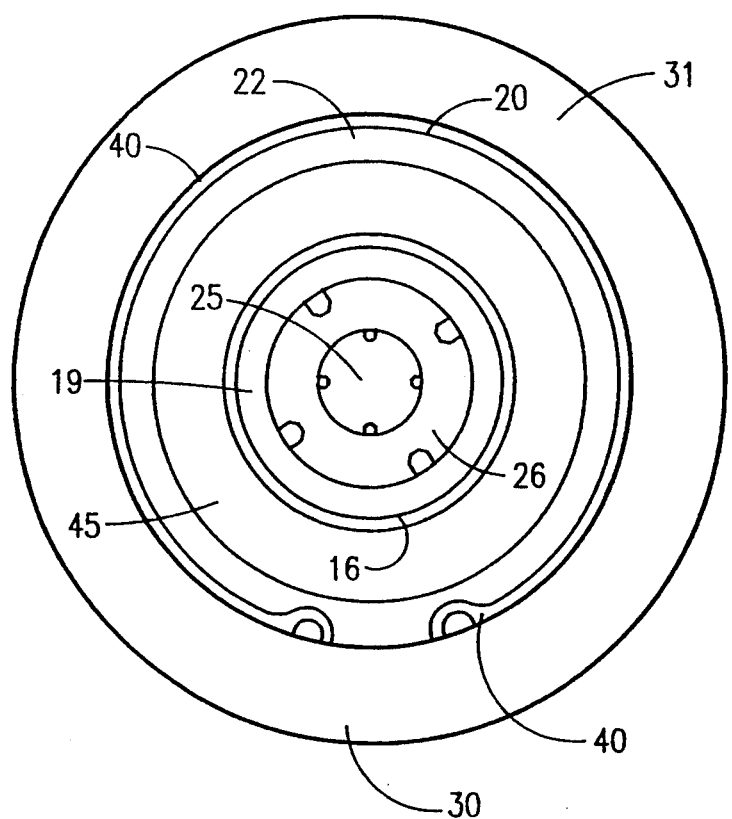
FIG. 2 is a plan view of the nonshaft side of the sealed-bearing roller assembly.
Figure 3:
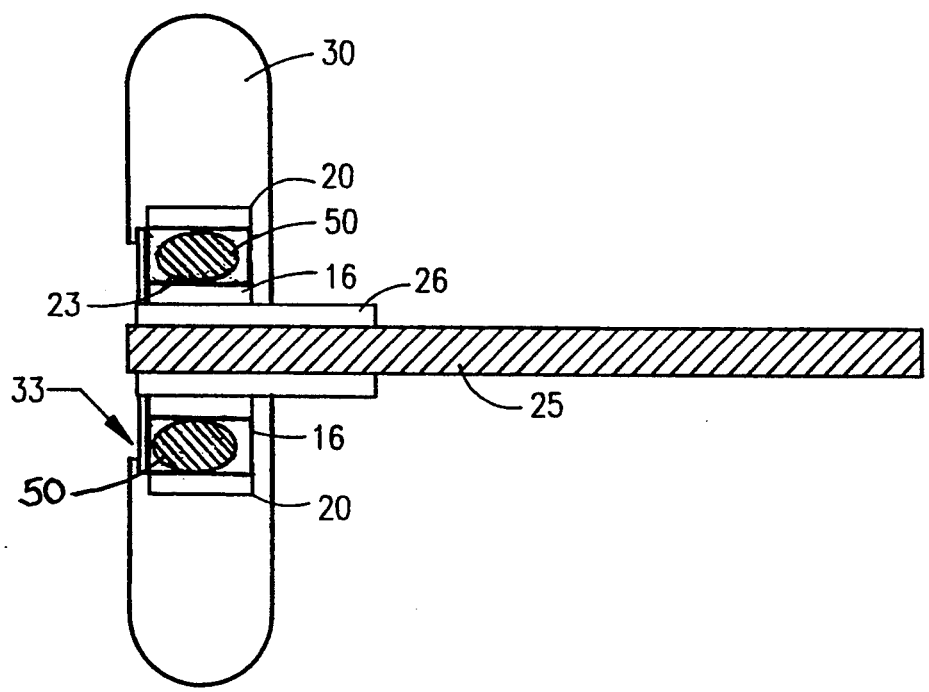
FIG. 3 is a cross-sectional side view of the sealed-bearing roller assembly taken along line 3—3 of FIG. 1.
Figure 4:
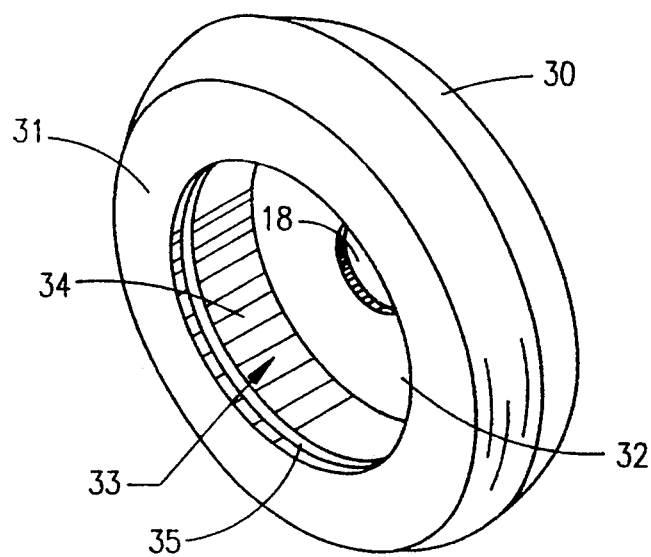
FIG. 4 is a perspective view of the roller body of the roller assembly.
Figure 5:
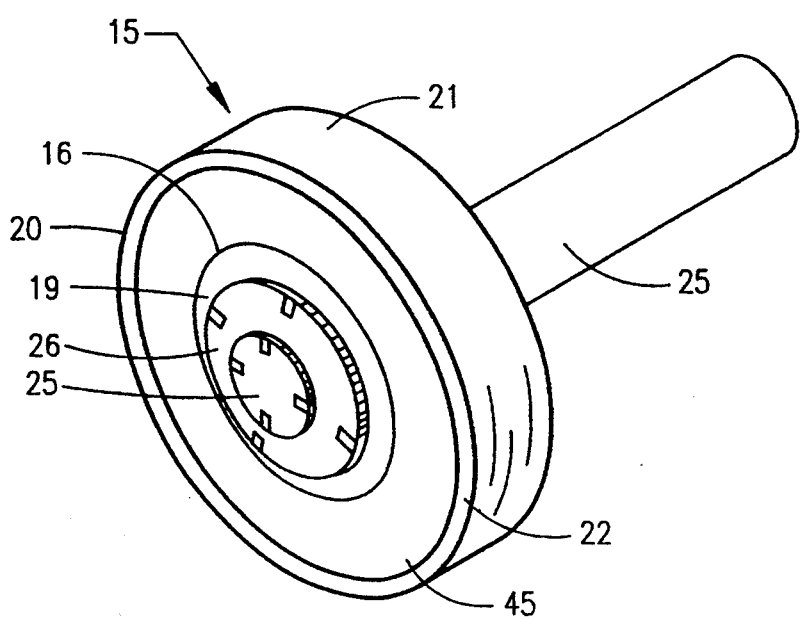
FIG. 5 is a perspective view of the bearing means and the axle member of the roller assembly.

Referring to the drawings in FIGS. 1 through 6, in particular, the sealed-bearing roller assembly 10 comprises a bearing means 15 having an outer race 20 and an inner race 16 spaced apart from one another and defining an annular passage 23 therebetween. The races each have annular flanges 19 & along the edges thereof and an annular wall 17 or 21. The inner race 16 is adapted to define a bore 18 through the bearing means 15. The interior of the wall 17 of the inner race 16 forms and defines the bore 18 through the bearing means 15. Eight steel balls 50 are rollably engaged in the passage 23 to allow the inner race 16 to rotate relative to the outer race 20 and vice versa. As shown in FIGS. 1, 2, & 5, two rubber annular seal members 45 & 46 are sealingly positioned between the inner and outer races 16 & 20 along the edges thereof to seal the passage 23 to substantially prevent moisture, dirt, and other foreign matter from getting into the passage 23 which also contains a lubricant to reduce the friction generally caused by the movement of the balls 50 in the passage 23. The annular seal members 45 & 46 are sealingly positioned between the inner and outer races 16 & 20 to further define the passage 23 therebetween and to enclose the passage 23 to prevent foreign matter in the environment from entering the passage 23 and damaging the bearing means 15. The seal members 45 & 46 are engaged to the flanges 22 on the outer race 20 and rotate with the outer race 20.

As illustrated in FIG. 5, an axle member 25 having two ends and a collar 26 fixedly attached about the axle member 25 near one end thereof is securely engaged in the bore 18 defined by the wall 17 of the inner race 16 for rotation therewith. The collar 26 on the axle member 25 is compressibly and securely engaged to the interior of the wall 17 of the inner race 16 with the axle member 25 coaxially extending outward from the bearing member.

Figure 6:
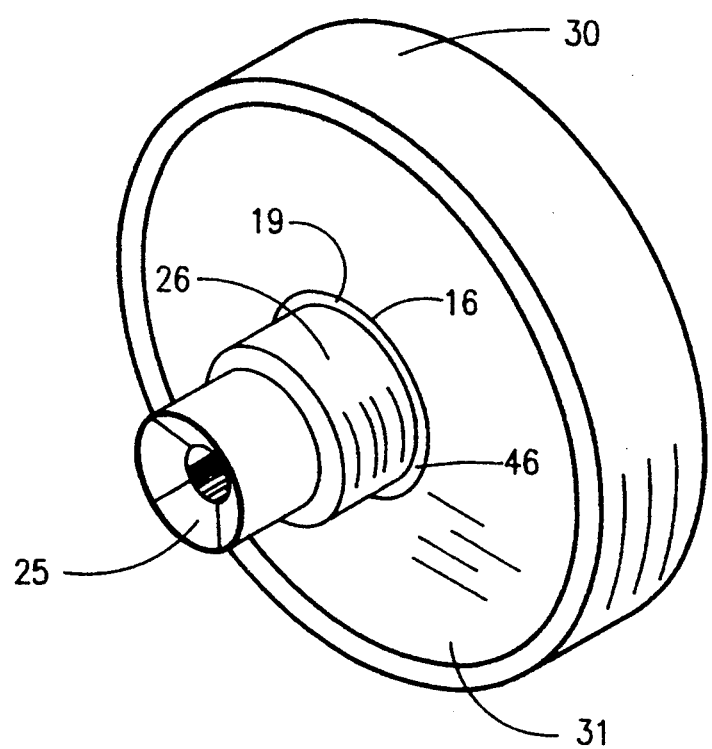
FIG. 6 is a perspective view of an alternate embodiment of the roller assembly showing a roller body and a roller axle member.

As illustrated in FIGS. 1, 3, & 4, a roller body 30 is securely embraced about the bearing means 15 for rotation with the outer race 20. The roller body 30 has an essentially circular body having a generally parabolic rim and being shaped similar to a tire mounted on a moveable vehicle. The roller body 30 further has a first side wall 31 and a second side wall 32. A bearing means 15 receiving slot 33 extends in the roller body 30 through the first side wall 31 along the axis of the roller body 30 and terminates at the second side wall 32. The bearing means 15 receiving slot 33 is dimensioned to securely engage about the exterior of the wall 21 of the outer race 20. A hole 36 having a diameter less than the diameter of the slot 33 coaxially extends through the second side wall 32 into the slot 33. The hole 36 is dimensioned to rotatably receive the collar 26 on the axle member 25. The axle member 25 extends outward through the hole 36 in the second side wall 32 which substantially shields moisture and debris from the bearing means 15. An annular groove 35 extends in the wall 34 defining the slot 33 and encircles the slot 33 near the first side wall 31. The annular groove 35 is dimensioned to engageably receive a retention member 40 such as a snap ring which engages a rim of the outer race 20 of the bearing means 15 to securely hold the bearing means 15 within the slot 33. The roller body 30 is preferably cast molded and formed of U.H.M.W. Polyethylene Plastic. As an alternate embodiment, the roller body 30 as shown in FIG. 6, can be a disk having a cylindrical-shaped body for rolling in rails or tracks as found in conveyor systems.

In operation, the distal end of the axle member 25 in relation to the collar 26 is preferably securely fastened to a moveable frame such as a garage door or a conveyor system. The roller body 30 is rollably positioned in a track or rail or on a surface upon which the roller body 30 can roll and move. The sealed-bearing roller assembly 10 allows the user to operate moveable systems such as conveyors and to open and close doors such as vertical moveable garage doors. The roller body 30 being formed of Polyethylene Plastic substantially resists rust and corrosion, is as resistant to abrasive materials as the prior art which is made of steel, produces less friction than the prior art, is self lubricating, and is longer lasting and less apt to wear out as quickly as the prior art.

Various changes and departures may be made to the invention without departing from the spirit and scope thereof. Accordingly, it is not intended that the invention be limited to that specifically described in the specification or as illustrated in the drawings but only as set forth in the claims.

What is claimed is:

1. A sealed-bearing roller assembly comprising:
    a bearing means having an inner race and an outer race spaced apart and defining a passage therebetween, said bearing means further having a plurality of balls rollably retained in said passage for allowing said inner and outer races to rotate in relation to one another, said inner race defining a bore along an axis of said bearing means;
    an axle member having a collar fixedly attached about one end thereof, said collared end securely engaged in said bore defined by said inner race, said axle member coaxially extending outward from said bearing means;
    a roller body having first and second side walls and having a bearing means receiving slot extending in said roller body through said first side wall and terminating at said second side wall, said roller body further having a hole extending through said second side wall into said slot which is dimensioned to engageably receive said bearing means, said hole through said second side wall being dimensioned relatively smaller than said slot and dimensioned to rotatably receive said collared end of said axle member, said second side wall substantially shielding a portion of said bearing means; and
    a retention member removeably engaging said bearing means and said roller body to effectively hold said bearing means in said slot.

2. A sealed-bearing roller assembly as described in claim 1, wherein said bearing means further comprises at least two annular seal members sealingly positioned between said inner and outer races and therebetween further defining said passage to substantially prevent environmental elements from entering said passage and effecting damage to said bearing means.

3. A sealed-bearing roller assembly as described in claim 1, wherein said roller body further has an annular groove about said slot near said first side wall for engageably receiving said retention member being engageable to said outer race of said bearing means to hold said bearing means in said slot.

4. A sealed-bearing roller assembly as described in claim 3, wherein said roller body is essentially a circular body having a generally parabolic rim for minimizing friction on a surface upon which said roller body is rollable.

5. A sealed-bearing roller assembly as described in claim 1, wherein said roller body is essentially a disk.

6. A sealed-bearing roller assembly as described in claim 1, wherein said roller body is formed of polyethylene.

* * * * *